US011545044B2

(12) United States Patent
Klein et al.

(10) Patent No.: US 11,545,044 B2
(45) Date of Patent: Jan. 3, 2023

(54) PORTABLE AND TOOLLESS MISSION RECONFIGURABLE TRAINER

(71) Applicant: Raydon 2 LLC, McLean, VA (US)

(72) Inventors: Donnie Ray Klein, Ormond Beach, FL (US); Anthony Vaghayeanegar, Port Orange, FL (US); Raymond H. Stemmle, III, Ormond Beach, FL (US); Angelo Anthony Moccia, Oak Hill, FL (US); David Phillip Donovan, Jr., Port Orange, FL (US); Lee Arthur Cardwell, Port Orange, FL (US); Jason Michael Kennedy, Ormond Beach, FL (US); Kendall Scott Hopkins, Daytona Beach, FL (US); Robert Lee Harvey, Jr., Port Orange, FL (US); Eric Shaw, Port Orange, FL (US); Jerry R. Hubbard, Port Orange, FL (US)

(73) Assignee: Raydon 2 LLC, McLean, VA (US)

( * ) Notice: Subject to any disclaimer, the term of this patent is extended or adjusted under 35 U.S.C. 154(b) by 0 days.

(21) Appl. No.: 17/543,174

(22) Filed: Dec. 6, 2021

(65) Prior Publication Data

US 2022/0165174 A1    May 26, 2022

Related U.S. Application Data

(63) Continuation of application No. 16/882,863, filed on May 26, 2020, now Pat. No. 11,195,429, which is a (Continued)

(51) Int. Cl.
*G09B 9/05* (2006.01)
*G09B 19/16* (2006.01)
*G09B 9/00* (2006.01)

(52) U.S. Cl.
CPC ............... *G09B 9/05* (2013.01); *G09B 9/003* (2013.01); *G09B 19/167* (2013.01)

(58) Field of Classification Search
CPC . G09B 9/00; G09B 9/003; G09B 9/08; G09B 9/085; G09B 9/05; G09B 9/10; G09B 19/167
See application file for complete search history.

(56) References Cited

U.S. PATENT DOCUMENTS

| 4,798,411 A | 1/1989 | Lin |
| 5,888,069 A | 3/1999 | Romanoff et al. |
| (Continued) | | |

FOREIGN PATENT DOCUMENTS

| KR | 10-1874860 B1 | 7/2018 |
| WO | 2017/176231 A2 | 10/2017 |

OTHER PUBLICATIONS

International Search Report and Written Opinion dated Nov. 26, 2019, directed to International Application No. PCT/US19/50922; 12 pages.

*Primary Examiner* — Timothy A Musselman
(74) *Attorney, Agent, or Firm* — Morrison & Foerster LLP

(57) ABSTRACT

A system and method are that includes a frame and a weapon mount on the frame that receives a weapon mock-up. The method includes setting up a trainer simulator including opening a transportable shipping container, wherein the transportable shipping container includes a coupled integrated common base frame and a universal mount tower. The method includes assembling a seat and pivoting the universal mount tower from a horizontal position to a vertical position wherein the universal mount tower auto-locks into position. The method includes delivering ground vehicle based weapon system training to a user using a continuum of human interface fidelities that includes a first,
(Continued)

second and third fidelity, wherein the user is first delivered training at a first fidelity, and then at a second fidelity and then at a third fidelity. A system for a mission reconfigurable trainer simulation is also presented.

14 Claims, 12 Drawing Sheets

Related U.S. Application Data continuation-in-part of application No. 16/130,145, filed on Sep. 13, 2018, now Pat. No. 11,004,352.

(56) References Cited

U.S. PATENT DOCUMENTS

| | | | |
|---|---|---|---|
| 6,033,014 | A | 3/2000 | Nightengale |
| 6,106,298 | A | 8/2000 | Pollak |
| 7,195,486 | B2 | 3/2007 | Mcgraw |
| 8,777,619 | B2 | 7/2014 | Schubert et al. |
| 9,330,576 | B2 | 5/2016 | Moran et al. |
| 2006/0197362 | A1 | 9/2006 | Mabon et al. |
| 2014/0272805 | A1 | 9/2014 | Klein et al. |
| 2016/0203728 | A1 | 7/2016 | Schubert et al. |

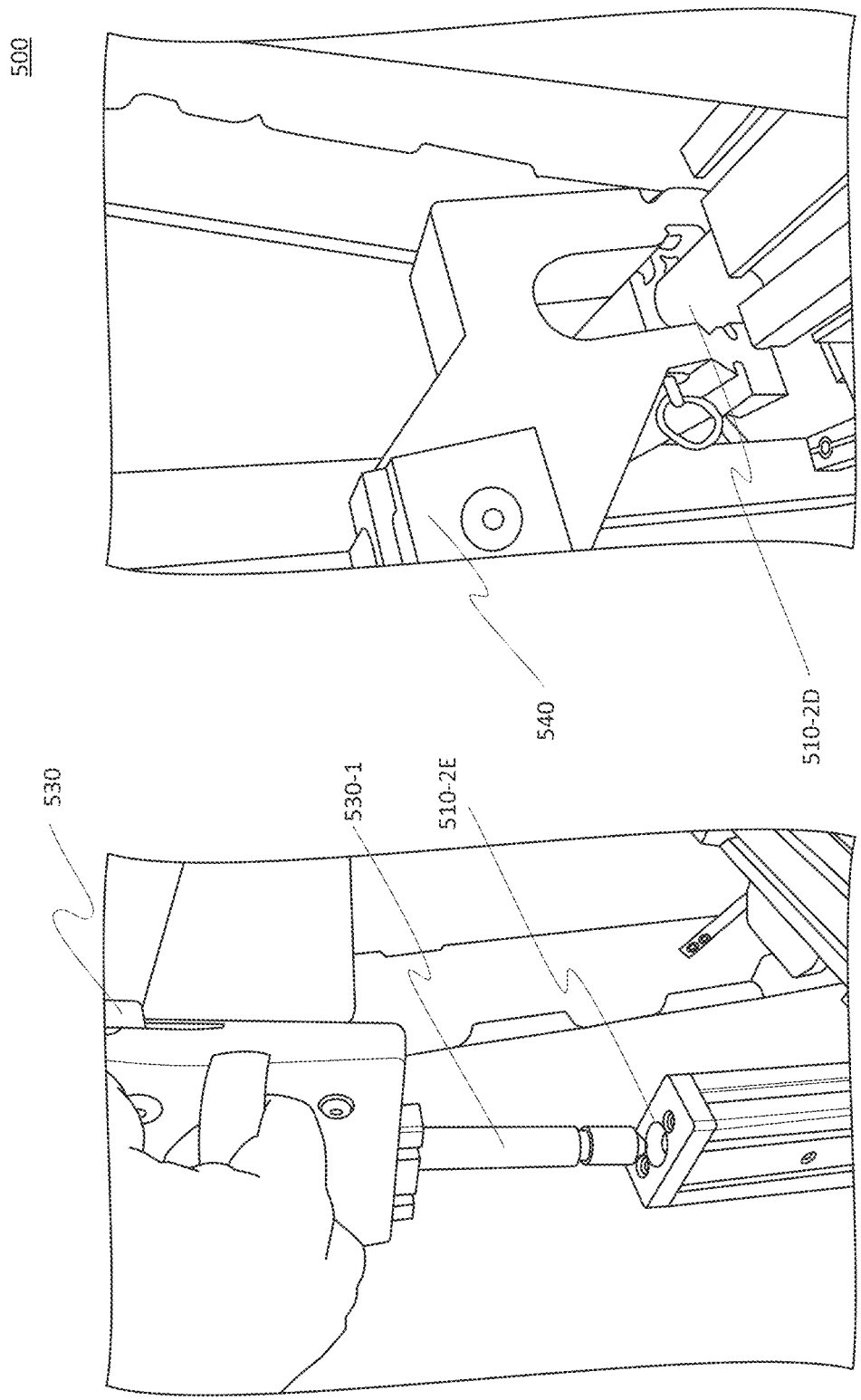

PORTABLE AND TOOLLESS MISSION RECONFIGURABLE TRAINER

REFERENCE TO RELATED APPLICATIONS

This application is a continuation of U.S. patent application Ser. No. 16/882,863, filed May 26, 2020, which is a continuation-in-part of U.S. patent application Ser. No. 16/130,145, filed Sep. 13, 2018, the entire contents of each of which are incorporated herein by reference.

FIELD

This disclosure relates to a simulation-based training system for individuals, crews, platoons and higher-level unit collections of vehicles on the usage of ground vehicles and ground vehicle-based weapon systems.

BACKGROUND

As understood in this document, a simulation system may be a physical structure in which real people and objects may move, change location, and possibly interact with each other. Further, these objects may interact with simulated people and objects, whose presence may be enacted via visual projections, audio emissions, or other means, typically in order to train for, prepare for, experience, analyze, or study real-life, potentially real-life, historical, or hypothetical situations, activities, or events. Simulations may be conducted for other purposes as well, such as educational or entertainment purposes, or for analyzing and refining the design and performance of mechanical technologies (such as transportation vehicles, weapons systems, etc.). The simulation as a whole may also be understood to include any technology that may be necessary or desirable to implement a simulation environment or simulation experience.

Realistic simulations of events may play a key role in many fields of human endeavor, from the training of police, rescue, military, and emergency personnel; to the development of improved field technologies for use by such personnel; to the analysis of human movement and behavior in such fields as athletics and safety research. Increasingly, modern simulation environments strive for a dynamic, adaptive realism, meaning that the simulation environment can both provide feedback to individuals in the environment and can modify the course of the simulation itself in response to events within the simulation environment.

Simulation training may be conducted using a variety of fidelities ranging from a physical embodiment of a particular gauge to a virtual reality rendering of that same gauge. The level of required fidelity to train an individual may be dependent upon the individual's level of training and the particular instrument, vehicle, or weapon in use. Further, different levels of fidelity may be required at different levels of training. The most effective level of fidelity that should be used in a simulation training system may be based on the tasks and skill being trained and the standard to which they may be evaluated.

SUMMARY

Given the foregoing, what is needed is a method and system for providing a ground vehicle based weapon simulation training system that is adaptable and reconfigurable with multi-level fidelities. Further, the simulation system must be capable of easy setup and modification to present multi-level fidelities for effective training. The system is portable and requires no tools to setup.

In an embodiment of the present disclosure, a mission reconfigurable trainer simulation system is presented. The system includes a transportable shipping container that houses and contains an integrated common base frame. The transportable shipping container also contains a pedestal pole, a seat base and a seat, wherein the pedestal pole is placed into the seat base and the seat snaps into the pedestal pole. An integrated universal mount tower is attached to the integrated common base frame and is unfolded by a user to auto-lock into an upright position. The integrated universal mount tower includes an upper universal mount and a lower universal mount. The mission reconfigurable trainer simulation system needs no tools to be setup and used. Further, the mission reconfigurable trainer simulation system remains in the transportable shipping container during use.

According to an embodiment, a mission reconfigurable trainer simulation system is presented that includes vehicle variant-specific assemblies. A lower vehicle variant-specific assembly is coupled to a lower universal mount and an upper vehicle variant-specific assembly is coupled to the upper universal mount. The upper and lower vehicle variant-specific assemblies may each be configured to operate in one of three fidelities.

According to another embodiment, there is provided a method of simulation training for a crew member. The method includes setting up a trainer simulator including opening a transportable shipping container, wherein the transportable shipping container includes a coupled integrated common base frame and a universal mount tower. The method includes assembling a seat by inserting a pedestal pole into a seat base coupled to the integrated common base frame and inserting a seat into the pedestal pole. The method further includes pivoting the universal mount tower from a horizontal position to a vertical position wherein the universal mount tower auto-locks into position.

In an embodiment, a method of simulation training for a crew member includes delivering ground vehicle based weapon system training to a user using a continuum of human interface fidelities that includes a first and a second fidelity, wherein the user is first delivered training at a first fidelity and then at a second fidelity, where the first fidelity is not the same as the second fidelity.

Further features and advantages of the present disclosure, as well as the structure and operation of various embodiments of the present disclosure, may be described in detail below with reference to the accompanying drawings. It is noted that the present disclosure is not limited to the specific embodiments described herein. Such embodiments may be presented herein for illustrative purposes only. Additional embodiments will be apparent to persons skilled in the relevant art(s) based on the teachings contained herein.

BRIEF DESCRIPTION OF THE FIGURES

The accompanying drawings, which are incorporated herein and form part of the specification, illustrate the present disclosure and, together with the description, further serve to explain the principles of the present disclosure and to enable a person skilled in the relevant art(s) to make and use the present disclosure.

Additionally, the left-most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may functionally the same, but may be located at different points in a simulation arena).

FIGS. 5A, 5B and 5C illustrate a lower universal mount and an upper universal mount, according to an embodiment of the present disclosure.

Further embodiments, features, and advantages of the present disclosure, as well as the operation of the various embodiments of the present disclosure, are described below with reference to the accompanying figures.

DETAILED DESCRIPTION OF THE DISCLOSURE

While embodiments described herein are illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

As used herein, the term "crew" or "crew member" refers to operation by a trainee (i.e., a human) of a weapon mounted in or on a vehicle, vessel or frame (e.g., a car, truck, boat, ship, fixed-wing aircraft, rotary-wing aircraft, etc.). The term "weapon" refers to any gun or rifle; grenade or rocket launcher; water cannon; acoustic, light or laser weapon; or other weapon for which operational training is desired. A "weapon mock-up" is a proxy weapon for use in a simulation. A "weapon mock-up" may be structurally identical (or similar) and/or functionally identical (or similar) to the actual weapon for which training/simulation is desired.

Figure 1:
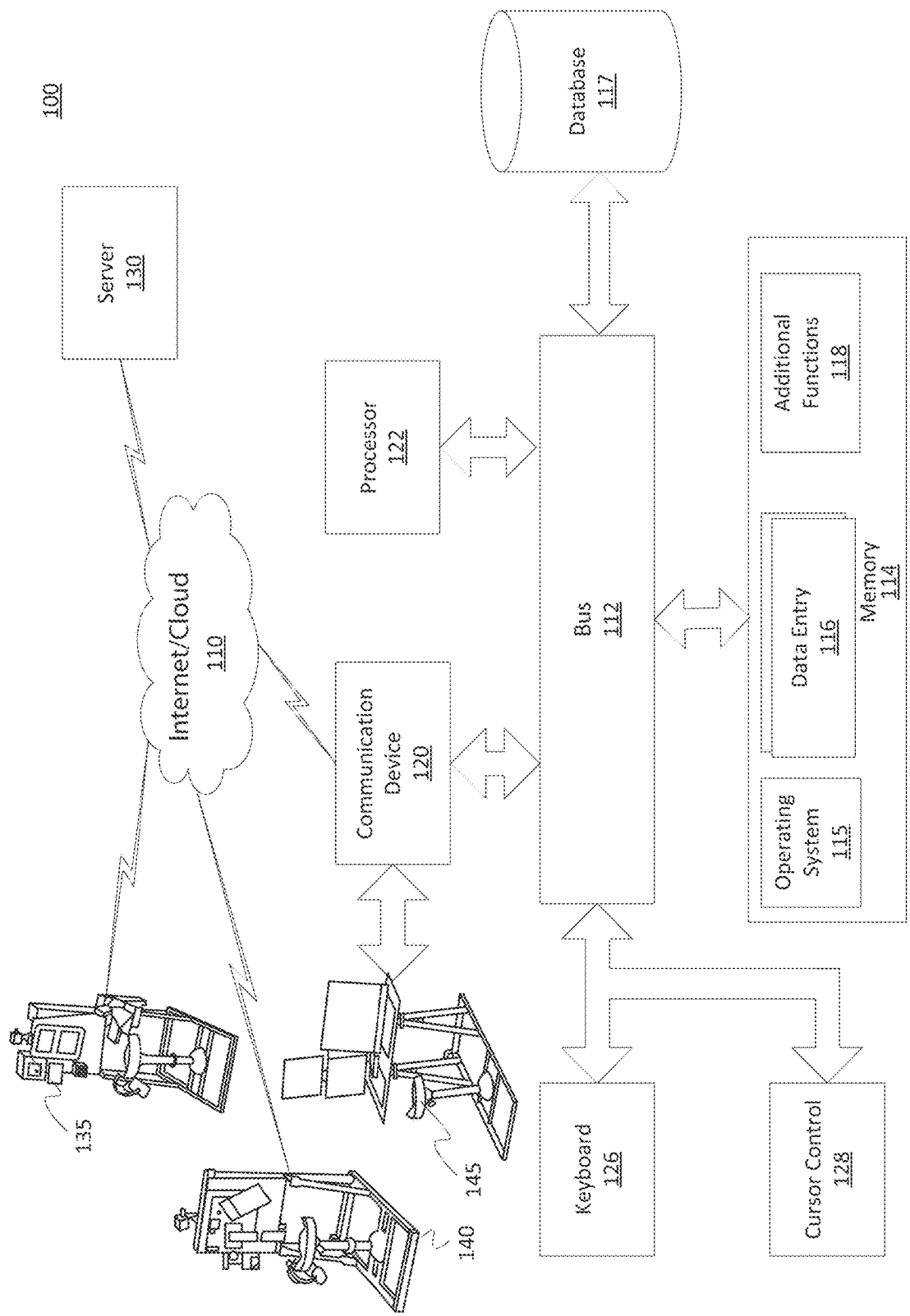
FIG. 1 is a block diagram of a computer server or system in accordance with embodiments that can implement any of the disclosed components herein.

FIG. 1 is a block diagram of a computer server system 100 in accordance with embodiments that can implement any of the disclosed components herein. As shown in FIG. 1, computer server system 100 may include a bus 112 and/or other communication mechanism(s) configured to communicate information between the various components of computer server system 100, such as a processor 122 and a memory 114. In addition, a communication device 120 may enable connectivity between processor 122 and other devices by encoding data to be sent from processor 122 to another device over a network, such as Internet/cloud 110, and decoding data received from another system over the network for processor 122. Processor 122 may also communicate with devices such as an instructor/operator system 145 directly through communication device 120, or via Internet/cloud 110 to modular crew trainer simulators 135 and 140.

In another example, communication device 120 may include a network interface card that is configured to provide wireless network communications. A variety of wireless communication techniques may be used including infrared, radio, Bluetooth®, Wi-Fi, and/or cellular communications. Alternatively, communication device 120 may be configured to provide wired network connection(s), such as an Ethernet connection.

In one embodiment, computer server system 100 includes processor 122 and other components communicating through Internet/cloud 110, or any other communication medium, to an electronic device such as a smartphone, tablet, etc. Instructor/operator system 145 can include a user interface that enables interaction by a user. Instructor/operator system 145 may include device drivers that enable software applications to interface with hardware devices. In an example embodiment of an Instructor/operator system 145 having a touch screen, instructor/operator system 145 may include a device driver to recognize and translate user input gestures into commands or signals capable of being used by applications. An input device interface may interface with the touch screen device driver of instructor/operator system 145 to receive user touch screen gestures. Instructor/operator system 145 can also include its own processor, memory, etc. In one embodiment, instructor/operator system 145 implements a browser and communicates using Hypertext Markup Language ("HTML") to the remainder of computer server system 100, which functions as a web server and provides web pages to Instructor/operator system 145 either directly or indirectly (i.e., through communication with one or more other web servers). In another embodiment, Instructor/operator system 145 communicates with server 130 that can also function as a web server and storage medium that provides data and/or web pages to instructor/operator system 145. Any of the communications can also be encrypted such as an encrypted cloud connection or an encrypted Internet connection.

Processor 122 may include one or more general or specific purpose processors to perform computation and control functions of computer server system 100. Processor 122 may include a single integrated circuit, such as a micro processing device, or may include multiple integrated circuit devices and/or circuit boards working in cooperation to accomplish the functions of processor 122. In addition, processor 122 may execute computer programs, such as an operating system 115, a data entry module 116, and application 118, stored within memory 114.

Computer server system 100 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for computer server system 100. The modules can include an operating system 115, data entry module 116 configured to provide data entry via a user interface, and all other functionality disclosed herein, as well as other additional functionality modules, such as application 118.

Memory 114, being non-transitory, may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Computer server system 100 may further include a keyboard 126 and a cursor control device 128, such as a computer mouse, to enable a user to interface with computer server system 100. Computer server system 100 further may include a database 117 coupled to bus 112 to provide centralized storage for data entry module 116 and application 118 and to store, for example, Point Of Service data as well as data for displaying the UI widget for date entry, customer data, etc. Database 117 can store data in an integrated collection of logically-related records or files. Database 117 may be an operational database, an analytical database, a curriculum database, a data warehouse, a distributed database, an end-user database, an external database, a navigational database, an in-memory database, a document-oriented database, a real-time database, a relational database, an object-oriented database, or any other database known in the art. Further, any or all of the databases may be an encrypted database.

Although shown as a single system, the functionality of computer server system 100 may be implemented as a distributed system. For example, memory 114 and processor 122 may be distributed across multiple different computers that collectively make up computer server system 100. As previously disclosed, Instructor/operator system 145 is generally a mobile system that may be remotely located from the remainder of computer server system 100, which functions as a web server. Further, one or more components of computer server system 100 may not be included. For example, for functionality as a user or consumer device, computer server system 100 may be a smartphone or other wireless device that includes a processor, memory, and a display, does not include one or more of the other components shown in FIG. 1, and includes additional components not shown in FIG. 1, such as an antenna, transceiver, or any other suitable wireless device component.

Figure 2:
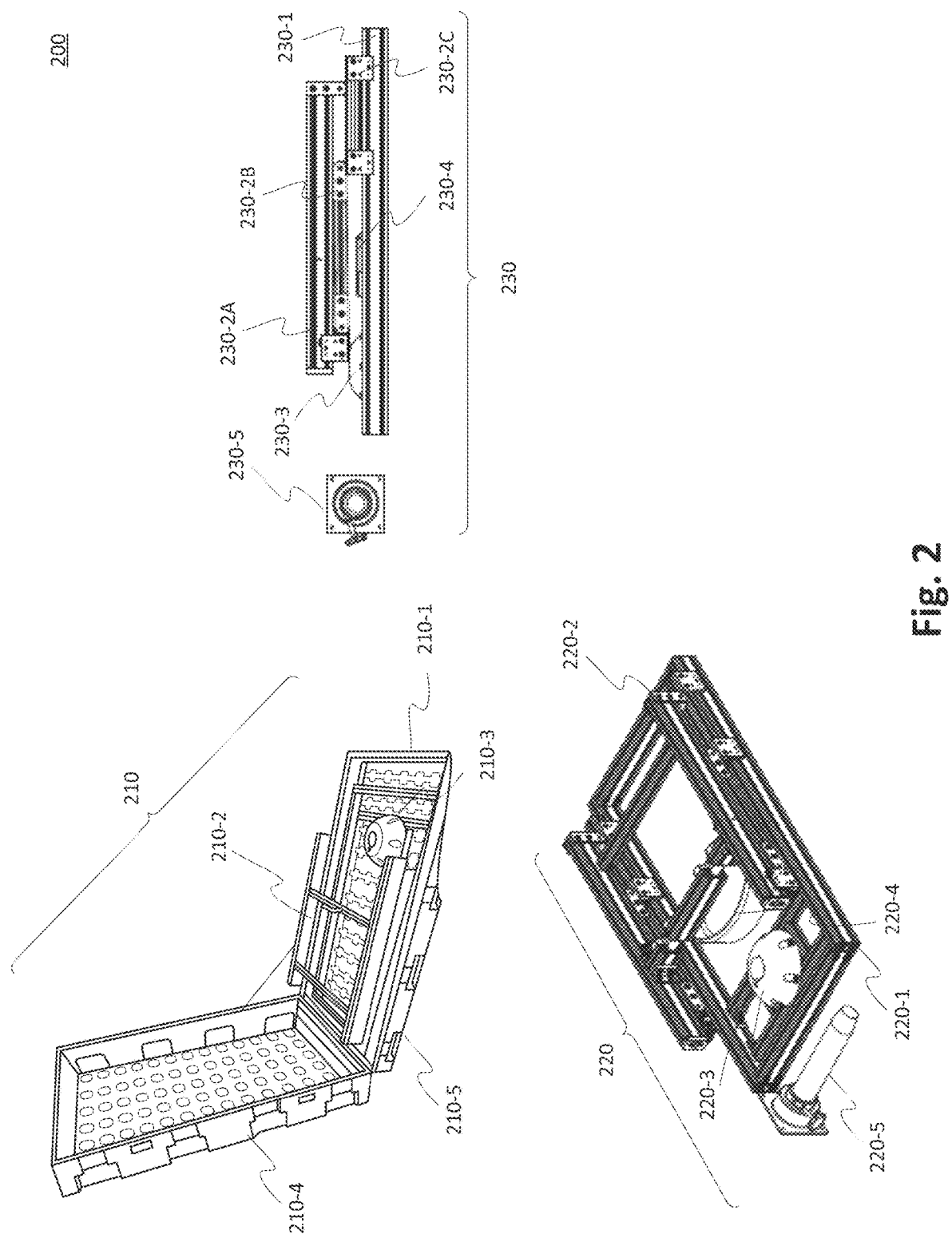
FIG. 2 illustrates a collapsed stage of a mission reconfigurable trainer simulation system, according to an embodiment of the present disclosure.

FIG. 2 illustrates a collapsed stage of a mission reconfigurable trainer simulation system 200, according to an embodiment. Mission reconfigurable trainer simulation system 200 includes an illustration 210 where the system is in a collapsed state. Mission reconfigurable trainer simulation system 200 also includes views 220 and 230 that illustrate a mission reconfigurable trainer simulation system where the integrated shipping container is not shown.

Illustration 210 includes a common base frame 210-1, an integrated universal mount tower 210-2, a seat base 210-3 and a shipping container consisting of a shipping container top 210-4 and a shipping container bottom 210-5.

Shipping container top 210-4 and shipping container bottom 210-5 close for shipping and handling purposes. In an embodiment, shipping container top 210-4 and shipping container bottom 210-5 may be designed in a clam-shell configuration that may be opened to reveal common base frame 210-1, integrated universal mount tower 210-2, seat base 210-3 and a seat (not shown). This is possible as common base frame 210-1 and integrated universal mount tower 210-2 may be coupled and pivoted to collapse for transport within shipping container top 210-4 and shipping container bottom 210-5.

View 220 shows a perspective view of a mission reconfigurable trainer simulation system 200, according to an embodiment. View 220 highlights the placement of the various components of mission reconfigurable trainer simulation system 200 within a shipping container, such as shipping container top 210-4 and shipping container bottom 210-5. View 220 illustrates common base frame 220-1, an integrated universal mount tower 220-2, a seat base 220-3, a seat 220-4 and a seat pedestal 220-5.

View 230 shows a side view of a mission reconfigurable trainer simulation system 200, according to an embodiment. View 230 highlights how mission reconfigurable trainer simulation system 200 may be stored and setup without the use of tools. View 230 illustrates common base frame 230-1, an integrated universal mount tower 230-2, a seat base 230-3, a seat 230-4 and seat pedestal 230-5. In an embodiment, integrated universal mount tower 230-2 actually consists of mount tower 230-2A, a set of pivoting support arms 230-2B that may be mounted to tower base 230-2C that rests on common base frame 230-1. Further, tower base 230-2C can slide back and forth along common base frame 230-1 allowing a user to adjust the distance between the user and the integrated universal mount tower 230-2.

Figure 3:
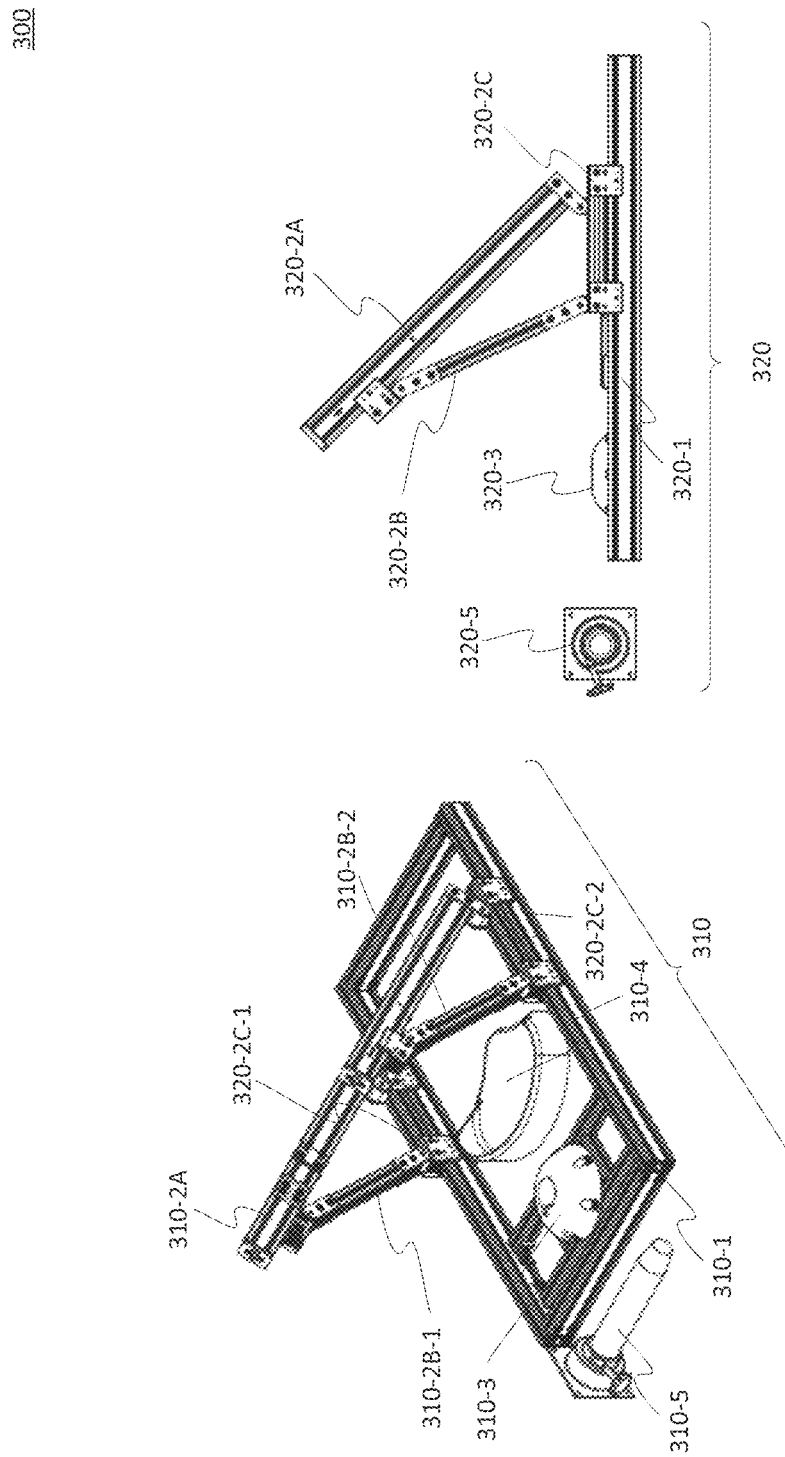
FIG. 3 illustrates a partially extended stage of a mission reconfigurable trainer simulation system, according to an embodiment of the present disclosure.

FIG. 3 illustrates a partially extended/collapsed stage of a mission reconfigurable trainer simulation system 300, according to an embodiment. FIG. 3 illustrates a perspective view 310 and a side view 320 of mission reconfigurable trainer simulation system 300.

View 310 illustrates common base frame 310-1, an integrated universal mount tower 310-2, a seat base 310-3, a seat 310-4 and seat pedestal 310-5. In an embodiment, integrated universal mount tower 310-2 actually consists of mount tower 310-2A, a set of pivoting support arms 310-2B-1 and 310-2B-2 that may be mounted to tower base 230-2C-1 and 230-2C-2 that both rest on common base frame 310-1.

Integrated universal mount tower 310-2 is extended into the partially extended/collapsed position shown in view 310 by a user applying an upward/downward force to integrated universal mount tower 310-2, such as gripping mount tower 310-2A. The extension or collapsing of mission reconfigurable trainer simulation system 300 is accomplished without the use of tools. Further, once integrated universal mount tower 310-2 is fully opened, as is shown in FIG. 4, the mechanism automatically locks into place.

View 320 illustrates common base frame 320-1, an integrated universal mount tower 320-2, a seat base 320-3, a seat 320-4 and seat pedestal 320-5. In an embodiment, integrated universal mount tower 320-2 actually consists of mount tower 310-2A, a set of pivoting support arms 310-2B that may be mounted to tower base 230-2C that may be coupled to common base frame 320-1.

Figure 4:
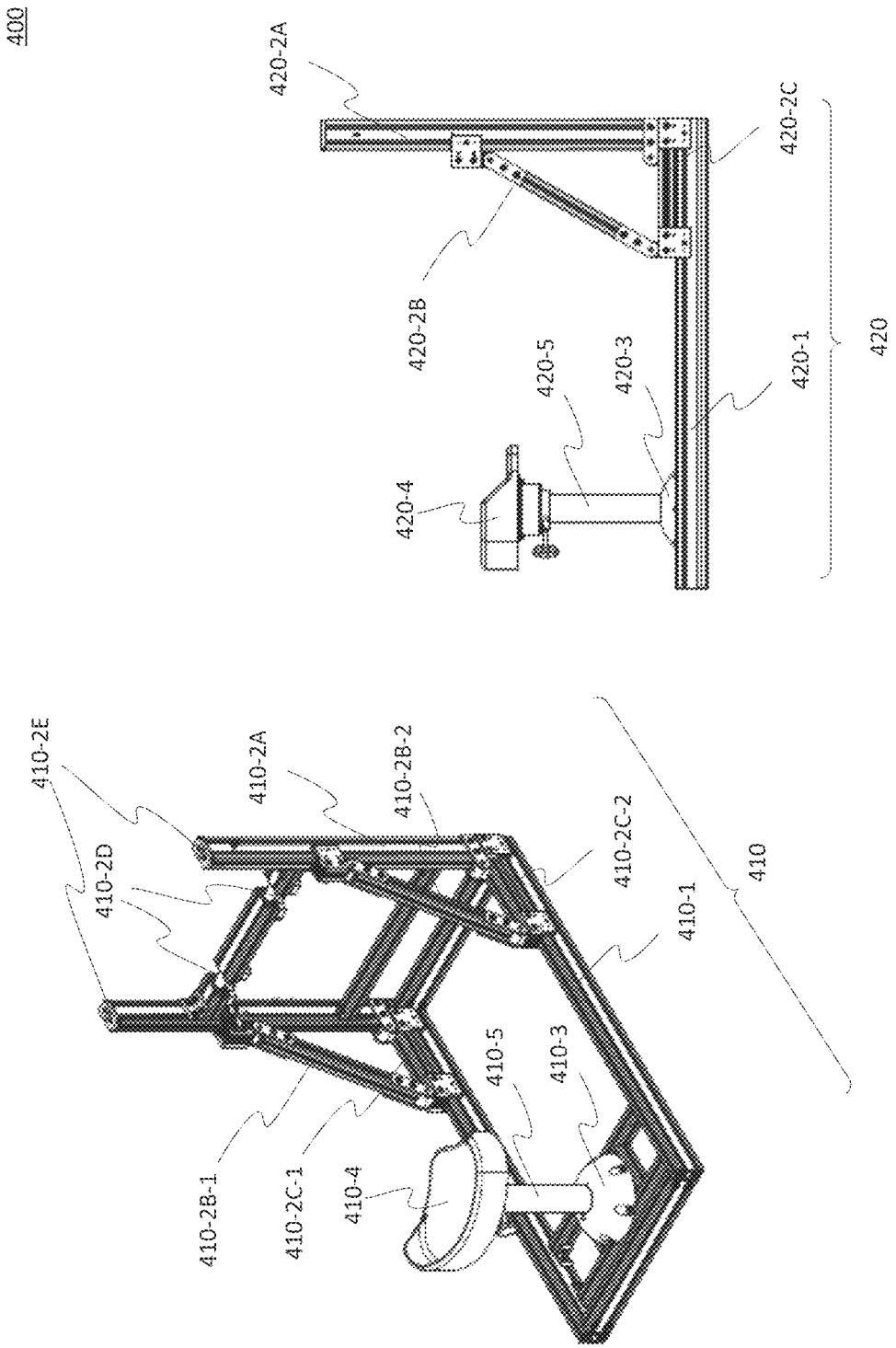
FIG. 4 illustrates a fully extended stage of a mission reconfigurable trainer simulation system, according to an embodiment of the present disclosure.

FIG. 4 illustrates a fully extended stage of a mission reconfigurable trainer simulation system 400, according to an embodiment. FIG. 4 illustrates a perspective view 410 and a side view 420 of mission reconfigurable trainer simulation system 400.

View 410 illustrates common base frame 410-1, an integrated universal mount tower 410-2, a seat base 410-3, a seat 410-4 and seat pedestal 310-5. In an embodiment, integrated universal mount tower 410-2 actually consists of mount tower 410-2A, a set of pivoting support arms 410-2B-1 and 410-2B-2 that may be mounted to tower base 410-2C-1 and 410-2C-2 that both rest on common base frame 410-1.

Integrated universal mount tower 410-2 is fully extended into an upright auto-lockable position as shown in view 410. The extension or collapsing of mission reconfigurable trainer simulation system 400 is accomplished without the use of tools. Further, once integrated universal mount tower 410-2 is fully opened, as is shown in FIG. 4, the mechanism automatically locks into place.

View 410 also illustrates the use of a lower universal mount 410-2D and an upper universal mount 410-2E. Lower universal mount 410-2D and an upper universal mount 410-2E accept modular upper and lower variant kits for use in training an individual crew member in a ground vehicle based weapon system. A lower variant kit is mounted, without tools, to lower universal mount 410-2D. An upper variant kit is mounted via mounting pegs into upper universal mount 410-2E, also without the use of tools. View 410 also illustrates an assembled seat where a seat pedestal 410-5 is inserted into seat base 410-3 that is configured to couple with seat 410-4 and is attached to the top of seat pedestal 410-5.

The variant-specific kits may be subdivided into upper and lower assemblies. These kit assemblies attach to the common base frame stand upper and lower universal mounts of each trainee crew position and may be connected via cables back to the common computer systems for I/O. The universal mount design allows each common base to be configured with vehicle crewmember-specific kits to simulate and train a wide variety of combat vehicle platforms' crew positions. These variants include but are not limited to the following vehicle families: HMMWV, Stryker, Abrams M1A2, Bradley M2A3, TWV and LAV. Examples of lower kits include: 1) IOS work surface with keyboard and mouse, 2) wheeled vehicle driver steering wheel, DVE control and foot pedals, 3) Stryker RWS weapon control grip. Examples of Upper kits include: 1) IOS operator touchscreen displays, 2) driver out the window view touchscreen display monitor with HMD VR-fidelity headset, 3) unstabilized gunner 50CAL weapon and pintle mount with HMD VR-fidelity headset. See below for a more detailed description of the types and configurations of upper and lower assemblies used for a particular vehicle or weapon system.

View 420 illustrates common base frame 420-1, an integrated universal mount tower 420-2, an assembled seat consisting of a seat base 420-3, a seat 420-4 and seat pedestal 420-5. In an embodiment, integrated universal mount tower 420-2 actually consists of mount tower 420-2A, a set of pivoting support arms 420-2B that may be mounted to tower base 420-2C that may be coupled to common base frame 420-1.

Figure 5C:
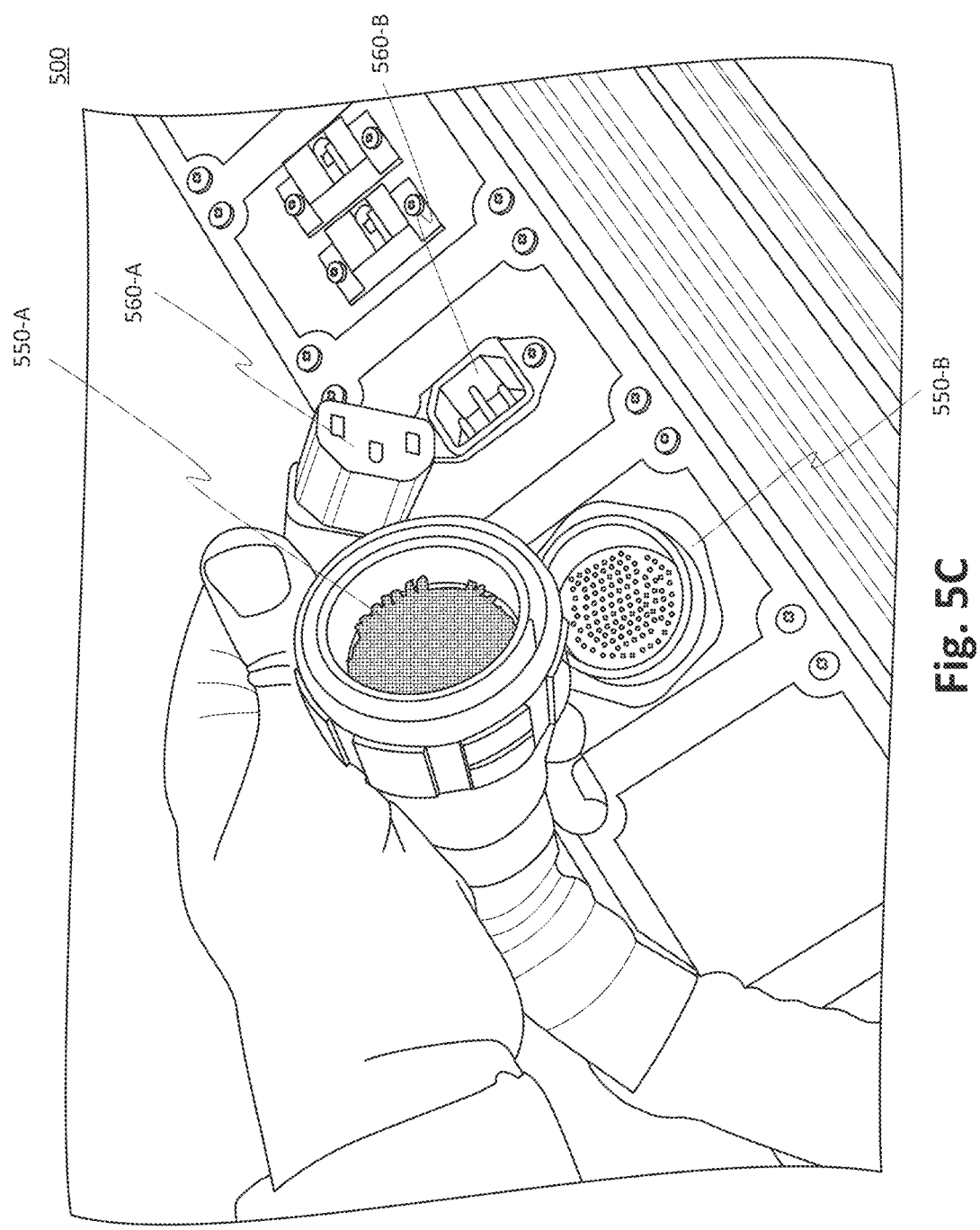

FIGS. 5A, 5B and 5C illustrate upper and lower variant kit mounts of a mission reconfigurable trainer simulation system 500, according to an embodiment. Specifically, FIG. 5A shows an upper universal mount 510-2E (left side shown) which contain holes into which an upper level variant kit 530 is inserted using mounting peg 530-1. The connection between upper level variant kit 530 and upper universal mount 510 does not require the use of any tools.

Similarly, FIG. 5B shows a lower universal mount 510-2D (right side shown) onto which a lower level variant kit 540 is attached without the use of any tools. FIG. 5C, in an embodiment, illustrates connectors 550B and 560B on lower level variant kit 540 and upper level variant kit 530. Connector 550-B carries data while connector 560-B shows a standard 120 volt connection. The 120 volt connector is shown as an example, but could be of any standard, or customized, plug configuration, e.g., International. Also shown is power cord 560-A that plugs into connector 560-B and data cable connector 550-A that connects into connector 550-B. The variant kits may be designed with a single power and a single data connector to ease setup and do not require the use of tools.

Figure 6A:
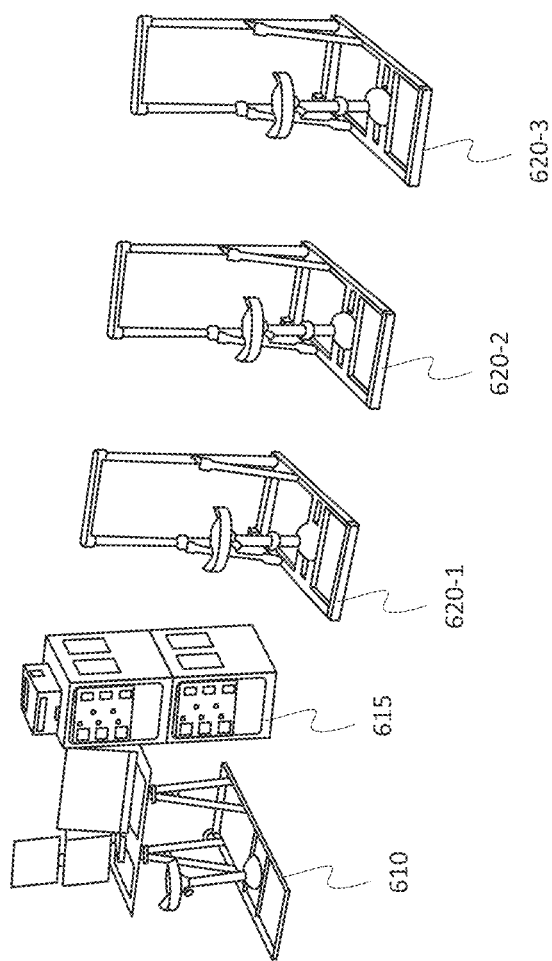
FIGS. 6A and 6B depict multiple upper and lower vehicle variant-specific assemblies with computer system module and an instructor station, according to an embodiment of the present disclosure.
Figure 6B:
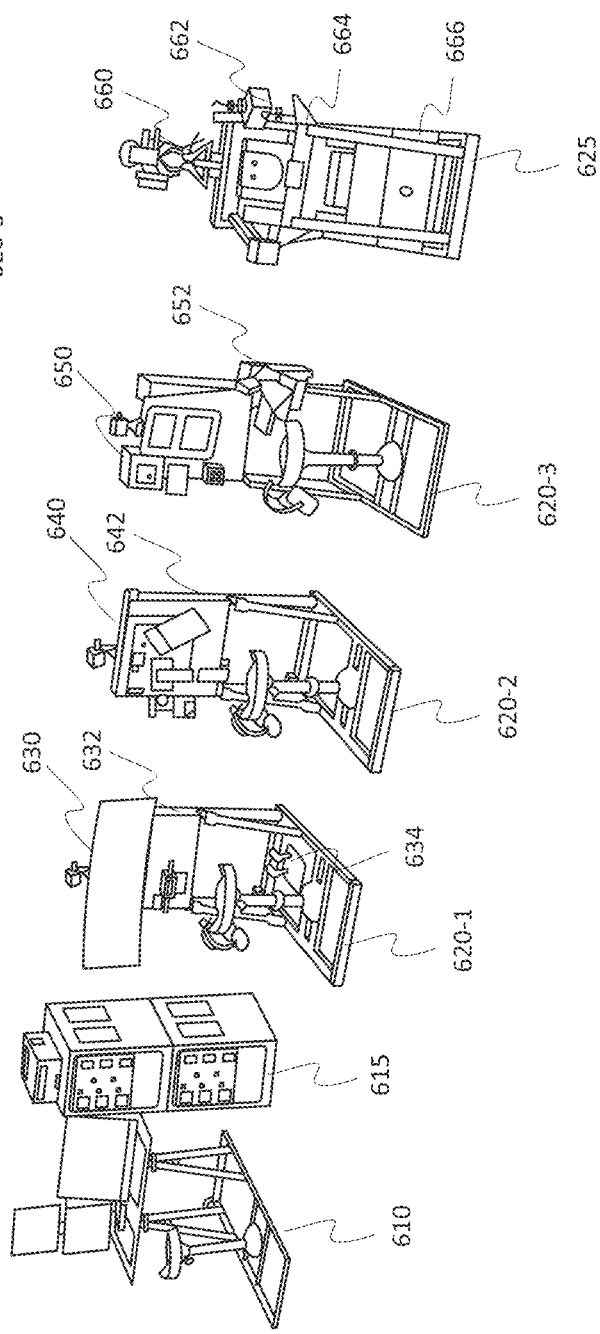

FIGS. 6A and 6B illustrate multiple upper and lower vehicle variant-specific assemblies with a computer system module and an instructor station, according to an embodiment. FIG. 6A illustrates a mission reconfigurable trainer simulation system prior to customization of the individual crew member stations. FIG. 6A depicts an instructor/operator station (IOS) 610 (a modular transportable computer control station), a computer module 615 and three crew member stations 620-1, 620-2 and 620-3. IOS 610 is used to monitor and control the curriculum associated with crew member stations 620. IOS 610 is also used to control interaction with other simulation training, such as at the squad or platoon level. IOS 610 is its own standalone system that may be used with any configuration of crew member stations.

Computer module 615 connects to each of the crew member stations 620. Computer module 615 isolates the necessary computer processing for control of the crew member stations 620 into a single point and is capable of supporting multiple types of vehicle variant-specific assemblies. This is done to avoid having to reconfigure each vehicle variant-specific assembly as would be required if each crew station was configured with its own computational unit. Thus, while different variant kits may be configured with each crew station, all of the variant kits may be supported by the single computational unit, computer module 615. Thus, in an embodiment, a single crew member simulation trainer configuration would require IOS 610 and computer module 615 in addition to a single crew member station 620.

FIG. 6B is an example configuration consisting of instructor/operator workstation IOS 610, computer module 615, crew member stations 620-1, 620-2 and 620-3 and 625. Crew member stations 620-1, 620-2 and 620-3 all use a common base frame with a seat base, seat pedestal and seat. Further, each of the crew member stations 620 and 625 may configured with different upper and lower variant kits. For example, crew member station 620-1 is configured with upper variant kit 630 and lower variant kit 632. Crew member station 620-1 is also configured with foot pedals 634 in addition to an upper and lower variant kit. Crew member station 620-2 contains upper variant kit 640 and lower variant kit 642, while crew member station 620-3 contains upper variant kit 650 and lower variant kit 652.

Crew member station 625 contains upper variant kit 660, which in this example is a gunner's position. Crew member station 625 also includes lower variant kit 662. However, crew member station 625 replaces the seat base, pedestal and seat with a support assembly 664 and a pressure plate 666, which is also referred to as a non-rotatable sensing platform. Support assembly 664 and pressure plate 666 replicates the rear edge of an unstabilized gunner's turret ring and the floor of the turret, where in the real combat platform, the gunner would lean against the turret ring to get better leverage to actuate the pressure plate under their feet to slew the turret and have a good stable stance from which to fire the weapon. See, U.S. Pat. No. 9,330,577 issued May 3, 2016 and assigned to Raydon Corporation.

Figure 7:
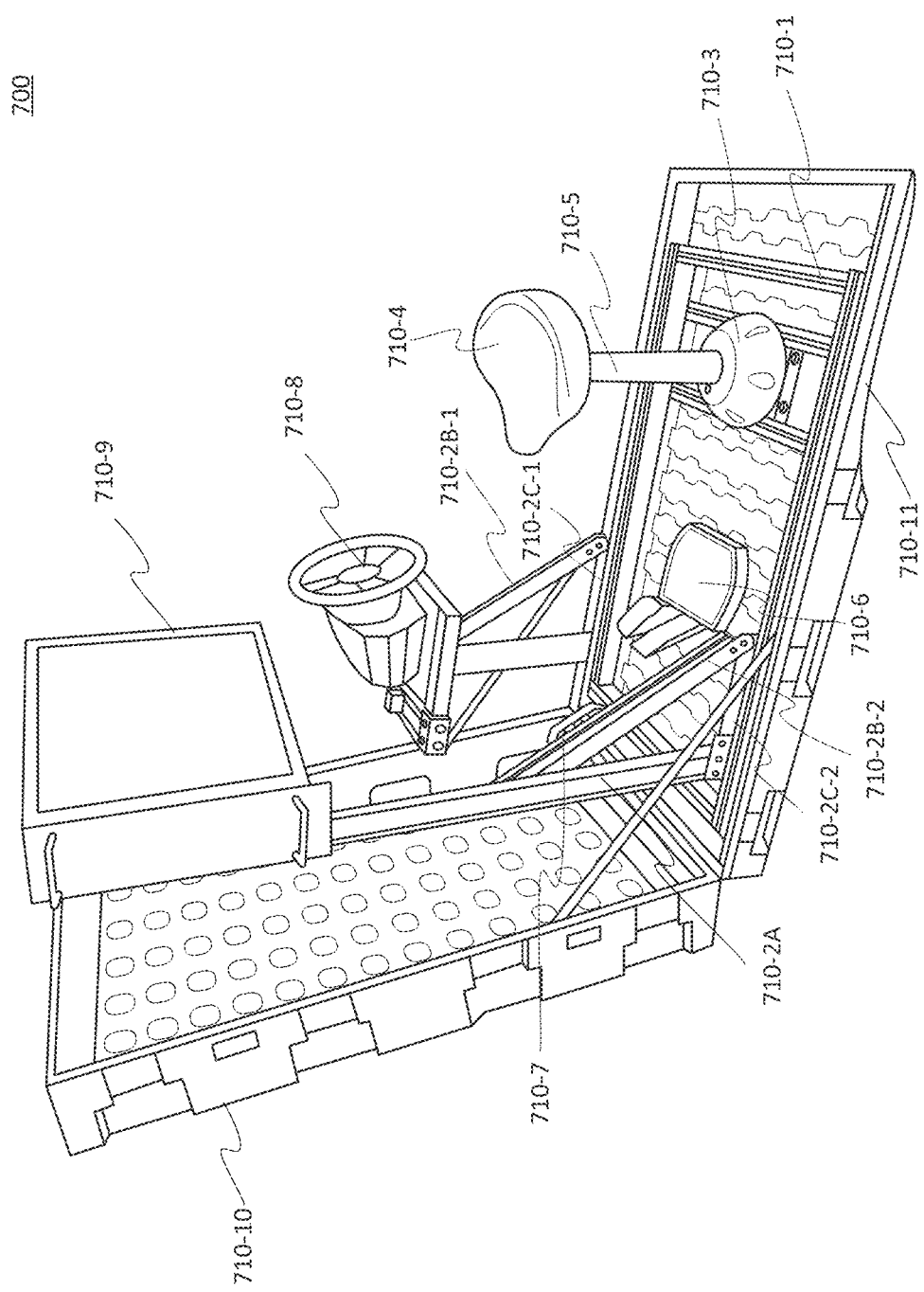
FIG. 7 depicts a mission reconfigurable trainer simulation system within its shipping container, according to an embodiment of the present disclosure.

FIG. 7 illustrates a fully configured mission reconfigurable trainer simulation system 700, according to an embodiment. FIG. 7 includes a common base frame 710-1, a universal mount tower 710-2, which consists of mount tower 710-2A, a set of pivoting support arms 710-2B-1 and 710-2B-2 that may be mounted to tower base 710-2C-1 and 710-2C-2 that both rest on common base frame 710-1. FIG. 7 also includes a seat base 710-3, a seat 710-4 and a seat pedestal 710-5 where seat 710-4 is inserted and locked into seat pedestal 710-5 that is inserted into seat base 710-3. In an embodiment, the system also includes foot pedals 710-6. Also shown is grip 710-7 that allows universal mount tower 710-2 to slide to and from the seat assembly and user. In this example, lower variant kit 710-8 consists of a steering wheel and controls while upper variant kit 710-9 is a display screen. The system is configured to be operational while it is contained within the bottom portion of the shipping container, i.e., shipping container bottom 710-11. Upon removing lower variant kit 710-8, upper variant kit 710-9 and foot pedals 710-6, the remaining components may be collapsed into shipping container bottom 710-11 and shipping container top 710-10 that may then be closed and may be wheeled away using integrated rollers in shipping container bottom 710-11. The shipping container with integrated rollers is designed to fit through a standard door opening and only requires two persons for lifting the system.

Portable and Toolless Assembly

The mission reconfigurable trainer is designed to provide a completely tool-less, accomplished without tools, set up by a user as the trainer utilizes using built in locking mechanisms. The common base frame, e.g., common base frame 210-1, is built into its case such that it remains in the case when opened like a clam shell. After opening, the enclosed seat is installed by sliding the enclosed pedestal pole into the enclosed seat base attached to the common base frame and placing the enclosed seat on the pedestal; both have locking clips and the seat height may be adjusted to fit the user's personal build without the use of a tool. The universal mount tower is extended by grabbing the top bracket and pulling up until it locks into the upright position.

Once the universal mount tower is extended to an upright position, the universal mount tower has integrated upper and lower universal mounts that accept vehicle variant-specific assemblies. Further, the vehicle variant-specific lower assembly and vehicle variant-specific upper assembly autolock into place, thus negating the use of tools. As previously described, the upper universal mount has holes that accept variant-specific upper assemblies with mounting pegs that slide down into the upper universal mount holes. Once the upper and lower variants are attached, the whole crew trainer tower may be pulled in/pushed back to the desired distance from the trainee using the tower grab handles, e.g., grip 710-7. The tower will not move however if pushed from the top or if inadvertently leaned upon. This design prevents unwanted tower movement during training or if an instructor or bystander leans on the tower assembly at any time. These common base kits with their universal mounts may be used to configure all trainer operator and trainee positions to include an IOS operator, driver, commander/squad leader, gunner and gunner/loader.

Individual, Crew, Platoon, Company and Battalion Training

The mission reconfigurable trainer design accomplishes training through a continuum of levels or echelons of training curriculum and configurations. Training is provided at the individual gunner level, the integrated combat platform crew level, the platoon level (2-4 vehicles), the company level (3-5 platoons). In addition, combined arms training may be accomplished through Distributed Interactive Simulation (DIS) interoperation and coordination with other commercial simulation products to simulate aviation, close air support, artillery, surrounding and opposing forces.

The mission reconfigurable trainer provides individual training at the crew member level. For example, a driver or gunner can learn to operate the driver controls or gunner's weapon system as an individual, without the participation of the other crew members. This individual training can deliver basic crewmember skills training and platform familiarity in a relatively low-stress environment. For a gunner, "trigger time" may be gained while becoming familiar with gunnery skills including target recognition, ranging and leading the target. Automated drivers and automated commanders help guide the gunner through a realistic training exercise.

The mission reconfigurable trainer provides crew-level training for the driver, commander/squad leader and gunner and gunner/loader crew members of the combat platform. 3-4 crew member stations may be connected, depending on the vehicle variant being trained, to a mission reconfigurable trainer computer rack, e.g., computer module 615, and IOS, e.g., IOS 610, via cable systems. The IOS is used to start the crew exercise. The crew will train as they fight using their intercom and radio to coordinate amongst the crew members and instructor. The commander/squad leader commands the driver and assists the gunner in scanning for targets. The commander and gunner coordinate target detection, recognition, fires and kill confirmations. The crew learns to perform as a cohesive crew team to move, shoot and communicate.

The mission reconfigurable trainer provides platoon-level training, by allowing the networked connection of 3-5 crew trainers to form a platoon. The crew trainers may be configured with vehicle variant kits as the same vehicle type, or as a mixed vehicle types as needed. Any one of the IOSs may be selected to initiate and run the platoon exercise. The platoon is commanded by the designated platoon leader trainee, the vehicles coordinate via radio between vehicle and intercom within their vehicle crews. The team of trainees is trained to move in vehicle formations, coordinate fires and communicate as a cohesive platoon.

The mission reconfigurable trainer is designed to deploy and train in company-sized networked configurations of 3-5 platoons. Vehicle type kits would be chosen to represent the desired task organization mix to meet the company or battalion training objectives. Main gun, wheeled combat, medical, command and logistics vehicles would likely be present, task organized to meet company and battalion mission training needs.

The mission reconfigurable trainer is also designed to interoperate via the distributed interactive simulation standard (DIS) with other commercial, external (non-mission reconfigurable trainer) simulation products to simulate aviation, close air support, artillery, surrounding and opposing forces. These external simulations provide additional training to the mission reconfigurable trainer crews and commanders by servicing calls for close air support (CAS) and artillery fires (CFF). These functions are key to maneuver training and may be accomplished through the open-source DIS standard interfaces built in to the mission reconfigurable trainer.

Fidelity Based Training

Training of an individual in the mission reconfigurable trainer is based on using a combination of various vehicle variant-specific assemblies where each assembly can utilize a different fidelity. Fidelity, as used within this application, does not simply refer to a "resolution" where a gauge could be displayed on a screen at a lower resolution, e.g., 320×200 pixels, or a medium resolution, e.g., 800×480 pixels, or a higher resolution, e.g., 1920×1200 pixels. Rather, fidelity is defined as a method of representation. For example a switch could be presented to a user through a heads up display with the ability to "virtually" touch the switch to turn it off or on. Or, the switch could be presented through a display with a touch sensitive surface. Or, the switch could be an actual physical switch that looks and feels like the "real" switch.

Different fidelities may be used within the mission reconfigurable trainer system depending upon what skill set is being targeted for a user and in addition to the skill level of that individual. One method of training involves a multi-step training process that begins with a one type of fidelity and then progresses to a different type of fidelity based on the tasks and skills being trained. For example, an initial driver trainee should learn all the vehicle systems and switchology on a high fidelity trainer in an individual mode first. Later, as part of a crew, the trainee will need to execute basic driving commands like following a route, pulling into a firing position, taking evasive driving maneuvers and can do this with a lower fidelity driver training seat in a crew trainer.

In another example, a low level of fidelity using a specific set of upper and lower vehicle variant-specific assemblies where the user is presented with a particular concept. Once the user has mastered the first level using the low fidelity level, a set of vehicle variant-specific assemblies that support a higher second level of fidelity may be used. This can easily be accomplished by removing the first level of vehicle variant-specific assemblies and replacing them with the second variant-specific assemblies that support the higher second level of fidelity. Once the user has mastered the second level a third level of variant-specific assemblies that support a high, third level of fidelity could be used.

The simulation training approach in the current disclosure is unique in that rather than determining the fidelity or mixture of fidelities for different controls of a particular training scenario being based on cost or design decisions, fidelities may be used, as described in the above examples, as a progression or sequence of fidelity levels directed to a particular type of desired training. The presented systems and methods allow for an optimization of customized training for a particular sequence of learning.

The mission reconfigurable trainer design accomplishes training through a continuum of human interface fidelities to include multiple fidelities, which may be defined as a virtual reality fidelity, a glass cockpit fidelity and high-fidelity. Because the mission reconfigurable trainer concept was designed to support training experimentation and effectiveness analysis, each of these human interface fidelities may be chosen, evaluated and used by the user's training staff to train various aspects of the combat platforms' maneuver and gunnery capabilities. Users can use one, two or all three fidelities as needed to accomplish their training objectives. All software and curriculum may be designed to operate in all fidelities. Further, each vehicle variant-specific lower and upper assembly is designed to support a specific fidelity level.

For example, the Virtual Reality (VR) Fidelity utilizes a virtual reality head-mounted display for the 360 degree visuals and virtual reality gloves for the hands. The trainees will see the inside of the vehicle's crew position to include any controls and indicators as well as views through windows and viewports. The VR gloves may be used to actuate active VR controls in the virtual view. The VR fidelity may be augmented with key physical controls that are critical to the trainee's psycho-motor skills training; examples include steering wheels, gunner's grips and triggers, remote weapons station (RWS) handles and the like. The VR fidelity is best used for initial familiarity with crew position layout and activities.

The glass panel fidelity is accomplished through the use of touchscreen displays. The dash layout of the combat vehicle is rendered on these displays to include controls, indicators, displays and gauges. The trainee uses touchscreen finger gestures to actuate the controls, for example: turning a knob or lever to a particular position, of moving a toggle switch through multiple positions. The glass panel fidelity may also be augmented with key physical controls that may be critical to the trainee's psycho-motor skill training; examples include steering wheels, gunner's grips and triggers, remote weapons station (RWS) handles and the like.

The high fidelity is a traditional three-dimensional hardware replication of controls and indicators. The human interface controls and indicators necessary for training may be replicated to closely approximate the shape, dimensions, relative locations, throws, forces and functionality of the actual combat platform. This precision is very important for key controls in order to engrain the necessary psycho-motor skills through training repetition. Research has shown that it is this high-fidelity training repetition that produces repeatable and significant real-word platform proficiency increases.

Combinations of the types of fidelities and vehicle variant-specific assemblies may also be dependent on the user's role. For example is the user a driver, or a squad leader or a gunner, or a gunner/leader. Training for each position may be optimized by varying the type of vehicle variant-specific assemblies being used. On the other hand, the instructor/operator station tends to be configured in one way, e.g., a touchscreen display, radio control and headset for the upper assembly and a keyboard and mouse on a work surface for the lower assembly. Given these options, table 2 below illustrates possible configurations of upper and lower assemblies for different positions at each of the three discussed fidelities. Table 1 defines the referenced acronyms.

TABLE 1

| Acronym | Definition |
| --- | --- |
| BICU | Biocular Image Control Unit |
| CCHA | Commander's Control Handle Assembly |
| CITV | Commander's Independent Thermal Viewer |
| CROWS | Common Remotely Operated Weapon System |

TABLE 1-continued

| Acronym | Definition |
|---|---|
| CSCP | Commander's Site Control Panel |
| DVE | Driver's Vision Enhancer |
| DVO | Direct View Optics |
| FBCB2 | Force XXI Battle Command Brigade and Below |
| FCU | Fire Control Unit |
| FUP | Forward Unity Periscope |
| GAS | Gunner's Auxiliary Site |
| GPCH | Gunner's Power Control Handle |
| GPS | Gunner's Primary Site |
| GPSE | Gunner's Primary Site Extension |
| HMD | Head-Mounted Display |
| HMMWV | High Mobility Multipurpose Wheeled Vehicle |
| IBAS | Improved Bradley Acquisition Subsystem |
| iCDU | Improved Commander's Display Unit |
| iDID | Improved Driver's Information Display |
| iGCDP | Improved Gunner's Control Display Panel |
| LAV | Light Armored Vehicle |
| MRT | Mission Reconfigurable Trainer |
| RBD | Remote Biocular Display |
| RWS | Remote Weapon System |
| TWV | Tactical Wheeled Vehicle |

TABLE 2

| Fidelity | Vehicle Variant | Driver Upper | Driver Lower | Commander/Squad Leader Upper | Commander/Squad Leader Lower | Gunner Upper | Gunner Lower |
|---|---|---|---|---|---|---|---|
| High Fidelity | Unstabalized MMG | Touchscreen Display, radio control and headset | Steering Wheel, gear select, parking brake, DVE control, brake and accelerator pedals | Touchscreen Display, radio control and headset, HMD, FBCB2 | work surface | Weapon (50 CAL, M240B, MK19), radio control and headset, HMD | Power joystick, turret handcrank, traverse platform, radio control and headset, HMD, thermal weapon sight |
| | Stryker RWS | Touchscreen Display, radio control and headset | Steering Wheel, gear select, parking brake, DVE control, brake and accelerator pedals | Touchscreen Display, radio control and headset, HMD, FBCB2 | work surface | RWS FCU display, vision block display, radio control and headset | RWS control grip |
| | Abrams M1A2 | Touchscreen Display, radio control and headset | Steering t-bar with transmission selector, brake, iDID | HMD, GPSE, iCDU, FBCB2, CITV, CROWS interface box, radio control and headset | CCHA, RWS control handle | GPS control panel, iGCDP, GPS, GAS, BICU, radio control and headset | GPCH |
| | Bradley M2A3 | Touchscreen Display, radio control and headset | Bradley A3 steering kit, gear selector, brake and accelerator pedals | RBD, CSCP, tactical display, radio control and headset | Comdr's handstation, system control box (shared) | IBAS, DVO, Gunner's sight control panel, radio control and headset | Gunner control handle, system control box (shared) |
| Glass Panel Fidelity | Unstabalized MMG | Touchscreen Display, radio control and headset | Steering wheel | Touchscreen Display, radio control and headset | Work surface | Touch-screen Display, radio control and headset | Power joystick, turret handcrank, traverse platform, radio control and headset, HMD, thermal weapon sight |

TABLE 2-continued

| | Vehicle | Driver | | Commander/Squad Leader | | Gunner | |
|---|---|---|---|---|---|---|---|
| Fidelity | Variant | Upper | Lower | Upper | Lower | Upper | Lower |
| | Stryker RWS | Touchscreen Display, radio control and headset | Steering wheel | Touchscreen Display, radio control and headset | Work surface | Touchscreen Display, radio control and headset | RWS control grip |
| | Abrams M1A2 | Touchscreen Display, radio control and headset | Steering t-bar with transmission selector, brake, iDID | Touchscreen Display, radio control and headset | CCHA, RWS control handle | Touchscreen Display, radio control and headset | GPCH |
| | Bradley M2A3 | Touchscreen Display, radio control and headset | Bradley A3 steering kit, gear selector, brake and accelerator pedals | Touchscreen Display, radio control and headset | Comdr's handstation, system control box (shared) | Touchscreen Display, radio control and headset | Gunner control handle, system control box (shared) |
| VR Fidelity | Unstabalized MMG | VR head-mounted display | VR gloves | VR head-mounted display | VR gloves | VR head-mounted display | VR gloves |
| | Stryker RWS | VR head-mounted display | VR gloves | VR head-mounted display | VR gloves | VR head-mounted display | VR gloves |
| | Abrams M1A2 | VR head-mounted display | VR gloves | VR head-mounted display | VR gloves | VR head-mounted display | VR gloves |
| | Bradley M2A3 | VR head-mounted display | VR gloves | VR head-mounted display | VR gloves | VR head-mounted display | VR gloves |

Figure 8:
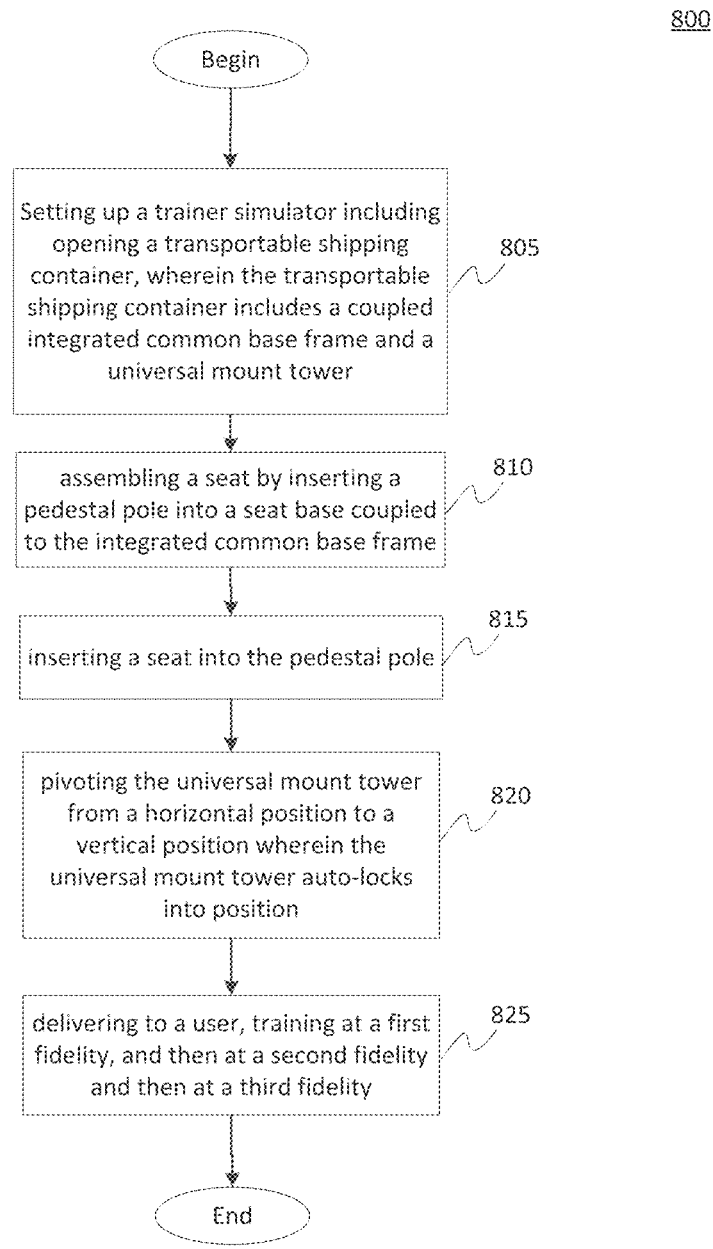
FIG. 8 depicts a flowchart of a method of simulation training for a crew member, according to an embodiment of the present disclosure.

FIG. 8 shows an exemplary embodiment of a method 800 for simulation training of a crew member. Method 800 begins at step 805 with setting up a trainer simulator including opening a transportable shipping container, wherein the transportable shipping container includes a coupled integrated common base frame and a universal mount tower. For example, FIG. 3 illustrates a partially extended/collapsed stage of a mission reconfigurable trainer simulation system 300. View 310 illustrates common base frame 310-1, an integrated universal mount tower 310-2, a seat base 310-3, a seat 310-4 and seat pedestal 310-5. In an embodiment, integrated universal mount tower 310-2 actually consists of mount tower 310-2A, a set of pivoting support arms 310-2B-1 and 310-2B-2 that may be mounted to tower base 230-2C-1 and 230-2C-2 that both rest on common base frame 310-1.

Method 800 continues to step 810 with assembling a seat by inserting a pedestal pole into a seat base coupled to the integrated common base frame. For example, in FIG. 4, view 410 illustrates an assembled seat where a seat pedestal 410-5 is inserted into seat base 410-3 with seat 410-4 attached to the top of seat pedestal 410-5.

Method 800 continues with step 815, with the inserting a seat into the pedestal pole. In addition to FIG. 4, FIG. 7 also illustrates a seat base 710-3, a seat 710-4 and a seat pedestal 710-5 where seat 710-4 is inserted and locked into seat pedestal 710-5 that is inserted into seat base 710-3.

Method 800 continues to step 820, with pivoting the universal mount tower from a horizontal position to a vertical position wherein the universal mount tower auto-locks into position. For example, FIG. 4 discloses a set of pivoting support arms 420-2B that may be mounted to tower base 420-2C that may be coupled to common base frame 420-1. In addition, FIG. 3 illustrates where integrated universal mount tower 310-2 is extended into the partially extended/collapsed position shown in view 310 by a user applying an upward/downward force to integrated universal mount tower 310-2, such as gripping mount tower 310-2A.

Method 800 continues with step 825, by delivering to a user, training at a first fidelity, and then at a second fidelity and then at a third fidelity. For example, as described above, one method of training involves a three step training process that begins with a low level of fidelity using a specific set of upper and lower vehicle variant-specific assemblies where the user is presented with a particular concept.

Figure 9:
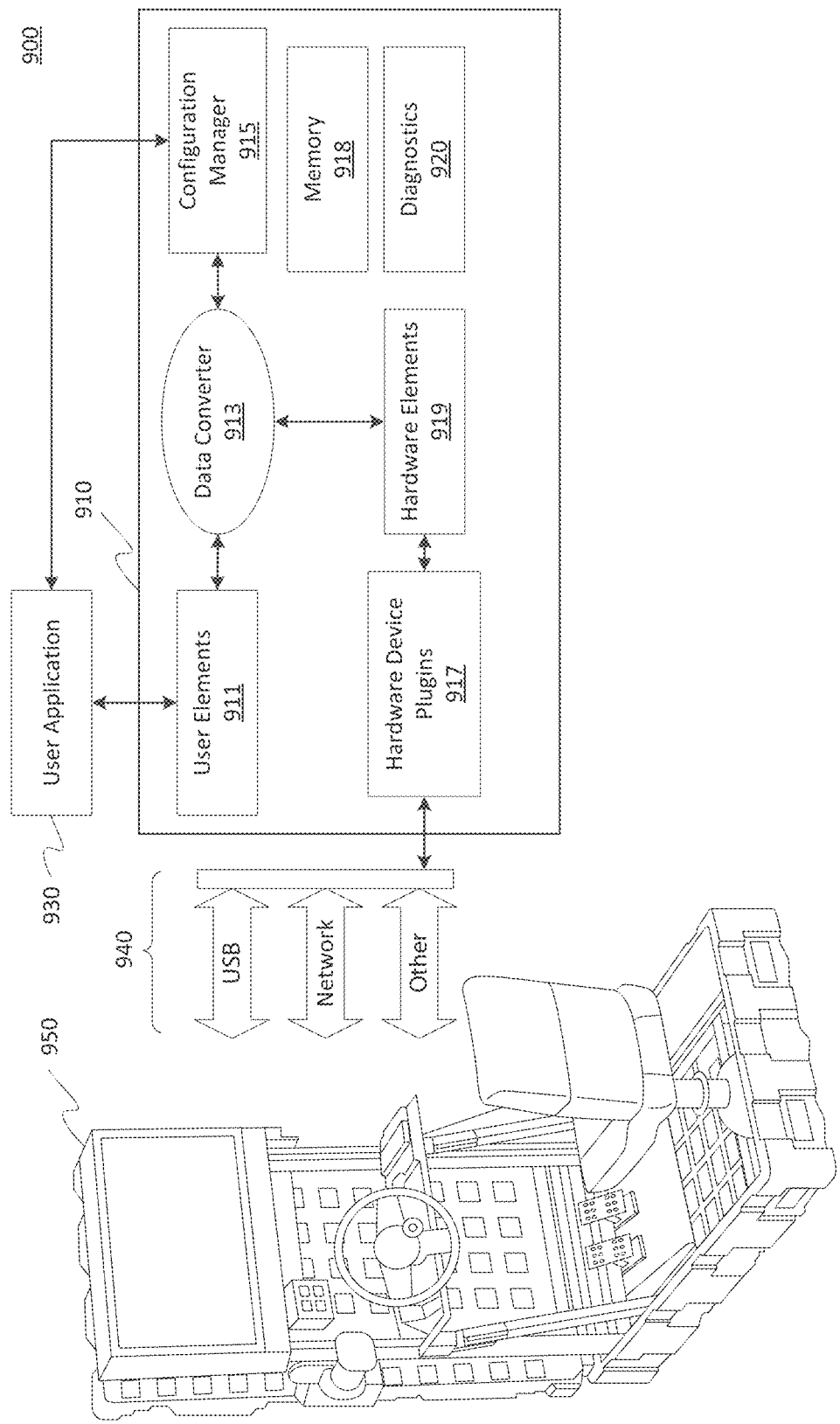
FIG. 9 depicts a mission reconfigurable trainer simulation system that includes a hardware application programming interface, according to an embodiment of the present disclosure.

FIG. 9 illustrates a mission reconfigurable trainer simulation system 900. System 900 includes a hardware application programming interface 910, a user application 930 (also referred to as application data), a systems interface 940, and a crew member station 950, according to an embodiment. The crew member station 950 may also be any of the instructor and/or crew trainer simulators presented in FIGS. 1-8 (e.g., instructor/operator systems 145 and 610, crew trainer simulators 135 and 140, crew member stations 620 and 625, and mission reconfigurable trainer simulation system 700). The hardware application programming interface 910 may be coupled to the crew member station 950 through an interface 940. The interface 940 may be any type of direct (e.g., a universal serial bus (USB)), networked, wireless (e.g., Bluetooth, cellular, etc.), or other type of communications link.

The hardware application programming interface 910 may provide the interface between a software application, for example, the user application 930 or any other software application, and any of the crew or instruction member stations, for example, the crew member station 950. The hardware application programming interface 910 may be implemented as an application program interface (API). The hardware application programming interface 910 may be a software component or a system comprised of hardware and/or software that is configured to simplify programming by abstracting underlying implementations.

The hardware application programming interface 910 enables applications, for example user application 930, to interface easily with a wide variety of trainer simulators, crew member stations, and mission reconfigurable trainer simulation systems. The user application may include be any simulation system software application, for example any simulation and/or training software associated with the scenarios outlined in Table 1. For example, the use of different fidelities for an upper or lower assembly for a variety of vehicle types.

The hardware application programming interface 910 may allow for the reuse, interchanging, and scaling of an application by providing the application with an abstract interface to the simulation systems. The interface may include input devices such as keyboards, mice, joysticks, steering wheels, cyclics/collectives, buttons, switches, knobs, etc., that may be found on a trainer simulator vehicle-specific control panel. The interface may also include output devices such as haptic feedback human interface devices, gauges, lights, dials, etc., that may be found on a trainer simulator vehicle-specific dashboard or control panel.

The hardware application programming interface 910 includes a set of user elements 911, a set of data converter 913, a configuration manager 915, a set of hardware device plugins 917, a set of hardware elements 919, and diagnostics 920, according to an embodiment. The user application 930 may issue reads and writes data via the user elements 911. The user elements 911 may be configured to include named data point that shield the user application 930 from the complex task of converting and routing data to and from a currently attached hardware or virtual device, for example, the crew member station 950.

User elements 911 may be directed to functions associated with a device, for example the crew member station 950. The functions may be actions such as steering, accelerating, braking, weapon controls, monitoring, etc. Any action associated with the device may be associated with a corresponding user element.

The user elements 911 may be coupled to the hardware elements 919 via the data converter 913. The data converter 913 is configured to translate a specific user element data in user elements 911 such that the data is consistently formatted and within a known and defined range, regardless of the type of device connected. The data converter 913 may be configured to create dead bands, reinterpreting device data or implementing value steppers (e.g., using two hardware buttons to increment or decrement a value). Further, the hardware device plugins 917 may provide translation between a specific set of hardware elements in the hardware elements 919 and a particular hardware device, such as crew member station 950.

The configuration manager 915 may contain listings of values associated with various user elements of the user elements 911 and values associated with various hardware elements of the hardware elements 919. The configuration manager 915 may be utilized as a translation table, matching particular user elements with other hardware elements. Further, a particular user element of the user elements 911 may be associated with multiple hardware elements of the hardware elements 919. For example, the hardware elements 919 may contain elements associated with different vendor devices.

The user elements 911 may provide a layer of abstraction between the user application 930 and any underlying hardware, for example crew member station 950. The user elements 911 may use simple, generic names and normalized values to refer to and express data quantities. For example, if the user application 930 included the use of a steering device, the user elements 911 may include a user element titled "steering." The steering user element may represent the current rotation of a vehicle's steering wheel. Further, the user element "steering" may have a defined range of −1.0 to +1.0, where −1.0 indicates that the steering wheel is rotated completely counter-clockwise to the left; where 0.0 indicated that the steering wheel is centered; and, where +1.0 indicates that the steering wheel is rotated completely clockwise to the right. Thus, the user application 930 may use the steering value in this manner regardless of the actual hardware deice being used to steer the vehicle. For example, a joystick device used for steering might return a raw value from 0 to 65535. In another example, a dedicated steering wheel device might return the steering rotation in degrees (e.g., from −450 to +450 degrees). In this example, regardless of the device being used, the user application 930 receives a value in its steering user element in the range of −1.0 to +1.0. The hardware device plugins 917 and the data converter 913 may be configured for each user element within the user elements 911 to convert and normalize raw data from a device, for example, the crew member station 950, and performing the necessary math or logic needed to convert and normalize raw data into the range defined for the particular user element. The user application 930 is thus able to communicate with various devices without regard to native data formats, ranges, and conventions used by the devices.

The diagnostics 920 system may be configured to detect and correct anomalies and identified errors within the hardware application programming interface 910. Anomalies may include inconsistencies in the hardware device plugins 917 for known values and relationships between user elements within user elements 911 and the hardware elements 919.

Figure 10:
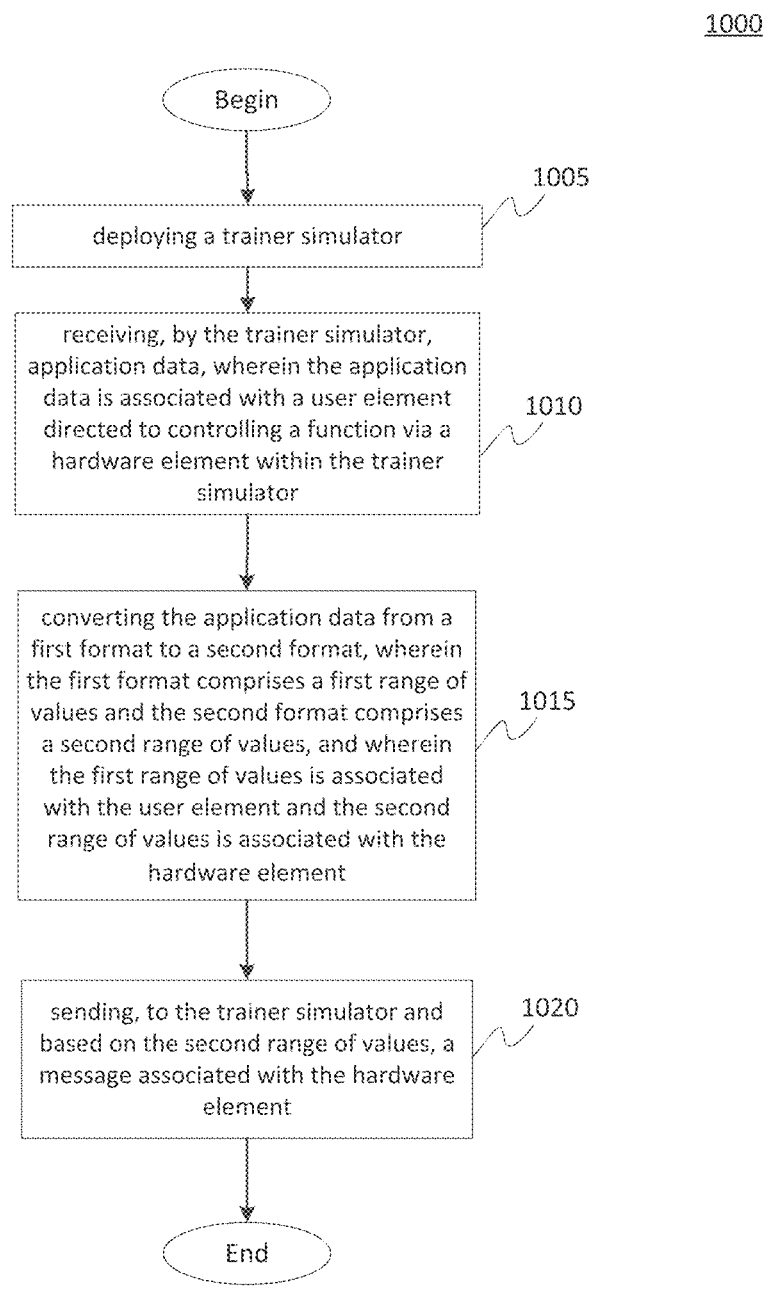
FIG. 10 depicts a first flowchart of a method for simulation training of a crew member with application data, according to an embodiment of the present disclosure.

FIG. 10 shows an exemplary embodiment of a method 1000 for simulation training of a crew member, according to an embodiment. Method 1000 begins at step 1005 with deploying a trainer simulator. For example, as discussed in FIGS. 2, 3, and 4. FIG. 2 shows a collapsed stage of a mission reconfigurable trainer simulation system. FIG. 3 shows a partially extended/collapsed stage of a mission reconfigurable trainer simulation system and FIG. 4 shows a fully extended stage of a mission reconfigurable trainer simulation system. Deploying in step 1005 may also include opening the transportable shipping container, wherein the transportable shipping container includes a coupled integrated common base frame and a universal mount tower, the universal mount tower comprising an upper universal mount and a lower universal mount and wherein the upper universal mount is configured to accept from a plurality of vehicle variant-specific upper assemblies and the lower universal mount is configured to accept from a plurality of vehicle variant-specific lower assemblies.

Step 1010 includes receiving, by the trainer simulator, application data, wherein the application data is associated with a user element directed to controlling a function via a hardware element within the trainer simulator. For example, a user application, such as the user application 930, may include application data associated with a function in the application. The user application may be a vehicle simulation program and thus may include functions related to steering, braking, accelerating, shifting, lights, weapons, gauges, dials, haptic systems, etc. The user elements may include named data points with a pre-defined range of values, for example, the −1.0 to +1.0 range previously discussed that represents the steering range of a steering wheel in a vehicle. The hardware device in this example may be the actual hardware steering wheel, where the hardware element represents the data elements associated with the actual device. Further, there may be multiple types and/or brands of steering wheels, each possibly having different input and/or output characteristics and therefore would be associated with corresponding hardware elements.

Step 1015 may include converting the application data from a first format to a second format, wherein the first format comprises a first range of values and the second format comprises a second range of values, and wherein the first range of values is associated with the user element and the second range of values is associated with the hardware element. As mentioned above regarding the steering example, the first format may be associated with the user element and thus, in the steering example, have a format range of −1.0 to +1.0 where the second range, associated with the hardware element may correspond to a particular steering mechanism with an input/output format range of 0 to 65535.

Step 1020 may include, sending, to the trainer simulator and based on the second range of values, a message associated with the hardware element. For example, using the steering example, the converted steering value in the format range of 0 to 65535 is sent via hardware device plugins 917 to the crew member station 950. The method then ends.

Figure 11:
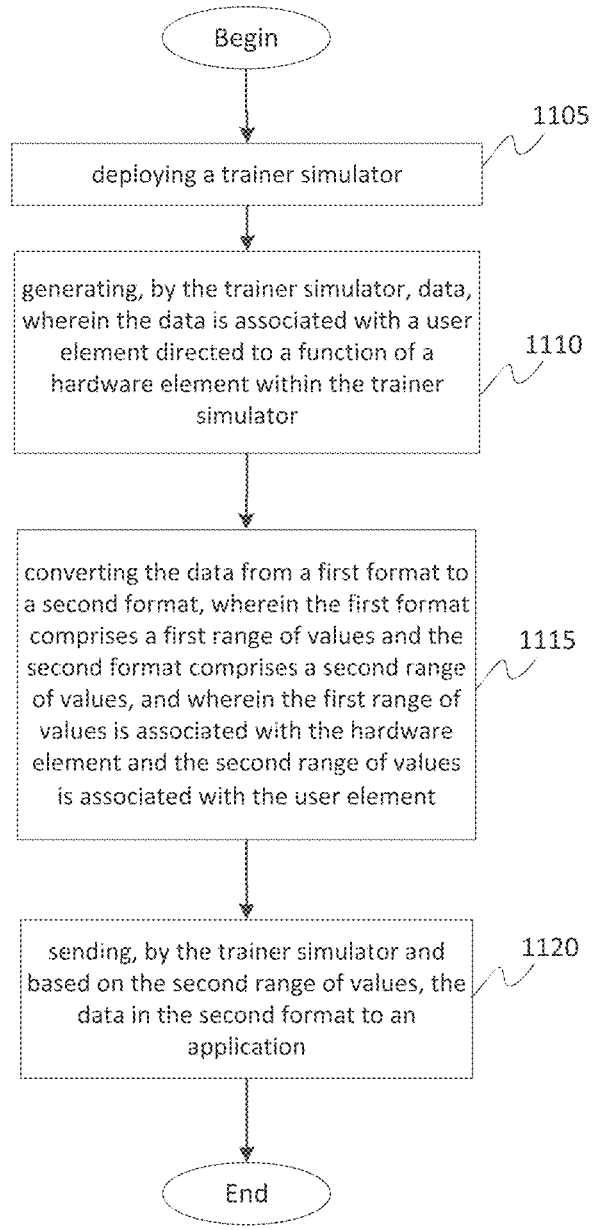
FIG. 11 depicts a second flowchart of a method for simulation training of a crew member with application data, according to an embodiment of the present disclosure.

FIG. 11 shows an exemplary embodiment of a method 1100 for simulation training of a crew member, according to an embodiment. Method 1100 begins at step 1105 with deploying a trainer simulator as discussed in step 1005 of method 1000.

Step 1110 includes generating, by the trainer simulator, data, wherein the data is associated with a user element directed to a function of a hardware element within the trainer simulator. For example, the trainer simulator may execute a user application, where the user application may be a vehicle simulation program and thus may include functions related to steering, braking, accelerating, shifting, lights, weapons, gauges, dials, haptic systems, etc. A user in the trainer simulator may, using the steering example, use a hardware device, such as a steering device, to steer a virtual vehicle in the vehicle simulation program. In doing so, the steering device may generate data associated with the use of the steering device. This data may be in the device's raw state, for example, in the steering example, the output range may be in the format range of 0 to 65535.

Step 1115 includes converting the data from a first format to a second format, wherein the first format comprises a first range of values and the second format comprises a second range of values, and wherein the first range of values is associated with the hardware element and the second range of values is associated with the user element. Continuing the example of the steering device, the raw data range of 0 to 65535 may be considered as a first format with a first range of values where the first range is associated with a hardware element of the steering device. The raw data may then be converted into a second format that conforms to a pre-defined standard. For example, the format range of −1.0 to +1.0 that is associated with a steering user element.

Step 1120 includes sending, by the trainer simulator and based on the second range of values, the data in the second format to an application. Step 1120 represents sending the converted data to an application, for example a vehicle simulation program. The method then ends.

CONCLUSION

The summary and abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

The invention claimed is:

1. A mission reconfigurable trainer simulation system comprising:
    a transportable shipping container comprising a coupled integrated common base frame;
    the integrated common base frame further coupled to an integrated universal mount tower; and
    the integrated universal mount tower configured to be pivoted into an upright auto-lockable position and comprising an upper universal mount and a lower universal mount, wherein the upper universal mount is configured to accept any of a plurality of vehicle variant-specific upper assemblies and the lower universal mount is configured to accept any of a plurality of vehicle variant-specific lower assemblies.

2. The mission reconfigurable trainer simulation system of claim 1, wherein the integrated universal mount tower is configured to be pivoted into an extended position by applying an upward force on the integrated universal mount tower, and is configured to be pivoted into a collapsed position by applying a downward force on the integrated universal mount tower.

3. The mission reconfigurable trainer simulation system of claim 1, wherein the transportable shipping container is configured to have dimensions which enable the container to fit through a standard door opening.

4. The mission reconfigurable trainer simulation system of claim 1, wherein the transportable shipping container is configured in a clam-shell configuration wherein when opened the integrated common base frame, integrated universal mount tower and seat base are contained in a bottom portion of the transportable shipping container and wherein a top portion of the transportable shipping container is removable.

5. The mission reconfigurable trainer simulation system of claim 1, wherein the integrated common base frame and integrated universal mount tower are configured with a plurality of built in locking mechanisms wherein setup of the mission reconfigurable trainer simulation system is accomplished without tools.

6. The mission reconfigurable trainer simulation system of claim 1, wherein the integrated universal mount tower is configured to slide on the integrated common base frame towards and away from a user.

7. The mission reconfigurable trainer simulation system of claim 1, wherein each of the plurality of vehicle variant-specific lower assemblies are configured to auto-lock into place in the lower universal mount without using tools.

8. The mission reconfigurable trainer simulation system of claim 1, wherein the upper universal mount is configured with upper universal mount holes, wherein each of the plurality of vehicle variant-specific upper assemblies are configured with mounting pegs that slide down into the upper universal mount holes without using tools.

9. The mission reconfigurable trainer simulation system of claim 8, wherein each of the plurality of vehicle variant-specific upper assemblies and vehicle variant-specific lower assemblies are each separately configurable to operate in a plurality of fidelities.

10. The mission reconfigurable trainer simulation system of claim 9, wherein the plurality of fidelities comprise a virtual reality fidelity, a glass panel fidelity, and a high fidelity.

11. The mission reconfigurable trainer simulation system of claim 9, wherein each of the plurality of vehicle variant-specific upper assemblies and the vehicle variant-specific lower assemblies each contain electronic components and are configured to communicate with a modular transportable computer control station.

12. The mission reconfigurable trainer simulation system of claim 1, wherein the transportable shipping container further comprises a seat base, wherein the seat base is replaced by a substantially non-rotatable sensing platform and a support assembly, wherein the substantially non-rotatable sensing platform is configured to support a standing user that leans against the support assembly.

13. The mission reconfigurable trainer simulation system of claim 1, further comprising a standalone instructor operator system comprising an enclosed clam-shell transportable shipping container coupled to an integrated common base frame, wherein the integrated common base frame is further coupled to an integrated universal mount tower and wherein the integrated universal mount tower is configured to be pivoted into an upright auto-lockable position.

14. The mission reconfigurable trainer simulation system of claim 13, further comprising a standalone modular, transportable computer system comprising software and curriculum to support both the mission reconfigurable trainer simulation system and the instructor operator system with a plurality of vehicle-specific training options.

* * * * *